United States Patent
Kim et al.

(10) Patent No.: US 10,743,019 B2
(45) Date of Patent: Aug. 11, 2020

(54) MOTION CONTROL SYSTEM AND METHOD USING DETECTION OF MOTION IN A VIDEO

(71) Applicant: CJ 4DPLEX CO., LTD., Seoul (KR)

(72) Inventors: Kyoung Hwan Kim, Seoul (KR); Hyoung Woo Lee, Seoul (KR); Hyung Jin Tak, Seoul (KR)

(73) Assignee: CJ 4DPLEX CO., LTD., Seoul (KR)

( * ) Notice: Subject to any disclaimer, the term of this patent is extended or adjusted under 35 U.S.C. 154(b) by 0 days.

(21) Appl. No.: 16/067,263

(22) PCT Filed: Dec. 26, 2016

(86) PCT No.: PCT/KR2016/015267
§ 371 (c)(1),
(2) Date: Jun. 29, 2018

(87) PCT Pub. No.: WO2017/116096
PCT Pub. Date: Jul. 6, 2017

(65) Prior Publication Data
US 2019/0020889 A1    Jan. 17, 2019

(30) Foreign Application Priority Data
Dec. 30, 2015    (KR) .................. 10-2015-0190032

(51) Int. Cl.
*H04N 19/513*    (2014.01)
*H04N 19/176*    (2014.01)
(Continued)

(52) U.S. Cl.
CPC .............. *H04N 19/513* (2014.11); *A63J 5/00* (2013.01); *A63J 25/00* (2013.01); *H04N 19/176* (2014.11);
(Continued)

(58) Field of Classification Search
None
See application file for complete search history.

(56) References Cited

U.S. PATENT DOCUMENTS

2002/0118862 A1*  8/2002  Sugimoto ................. G06T 7/20
                                                    382/103
2003/0095601 A1*  5/2003  Kondo ....................... G06T 7/20
                                                    375/240.16
(Continued)

FOREIGN PATENT DOCUMENTS

CN    202672795 U    1/2013
CN    203016321 U    6/2013
(Continued)

OTHER PUBLICATIONS

Lee et al., "Estimating the 3D Posture of 6DOF Platform from Image Sequence", 2007 International Symposium on Advanced Intelligent Systems, Sep. 5-8, 2007, Sokcho, Korea (Year: 2007).*

(Continued)

*Primary Examiner* — Stuart D Bennett
(74) *Attorney, Agent, or Firm* — Hauptman Ham, LLP (57) ABSTRACT

The present invention relates to a motion control system and method using detection of motions in a video, and the motion control system includes: a video processing device for decoding encoded video to extract motion vectors and residual values of effective macroblocks, producing motion codes using the extracted motion vectors and residual values of the effective macroblocks, reproducing the decoded video, and transmitting the produced motion codes and the time codes corresponding to the video being reproduced to a motion control device; and the motion control device for receiving the time codes and motion codes from the video processing device and controlling motions of actuators (Continued)

according to the motion codes if the time values of the time codes and motion codes correspond to each other.

10 Claims, 4 Drawing Sheets

(51) Int. Cl.
  *A63J 5/00* (2006.01)
  *A63J 25/00* (2009.01)
  *H04N 19/625* (2014.01)
  *H04N 19/139* (2014.01)
  *H04N 19/44* (2014.01)

(52) U.S. Cl.
  CPC ...... *H04N 19/625* (2014.11); *A63J 2005/002* (2013.01); *H04N 19/139* (2014.11); *H04N 19/44* (2014.11)

(56) References Cited

U.S. PATENT DOCUMENTS

| | | | |
|---|---|---|---|
| 2007/0075576 A1 | 4/2007 | Kondo et al. | |
| 2014/0192869 A1* | 7/2014 | Laroche | H04N 19/176 375/240.12 |
| 2014/0313410 A1* | 10/2014 | Choi | H04N 21/4131 348/460 |

FOREIGN PATENT DOCUMENTS

| | | |
|---|---|---|
| CN | 104067613 A | 9/2014 |
| CN | 204862059 U | 12/2015 |
| JP | 2004-261272 A | 9/2004 |
| KR | 10-2011-0030097 A | 3/2011 |
| KR | 10-2011-0072426 A | 6/2011 |
| KR | 10-1131093 B1 | 4/2012 |
| KR | 10-1154122 B1 | 6/2012 |
| KR | 10-2013-0050883 A | 5/2013 |
| WO | 2013125797 A1 | 8/2013 |

OTHER PUBLICATIONS

International Search Report dated Mar. 3, 2017, issued in corresponding International Application No. PCT/KR2016/015267.
Korean Office Action dated Nov. 3, 2016, issued in corresponding Korean Application No. 10-2015-0190032.
Extended European Search Report for PCT/KR2016015267 dated May 23, 2019.
Written Opinion of the Extended European Search Report for PCT/KR2016015267 dated May 23, 2019.
Imgeun Lee and Soowhan Han, "Estimating the 3D Posture of 6DOF Platform from Image Sequences", 2007 International Symposium on Advanced Intelligent Systems, Sep. 5-8, 2007, Sokcho, Korea, cited in the NPL No. 1.
Chinese Office Action dated Jan. 6, 2020, in connection with the Chinese Patent Application No. 201680081410.0.

* cited by examiner

MOTION CONTROL SYSTEM AND METHOD USING DETECTION OF MOTION IN A VIDEO

CROSS REFERENCE TO RELATED APPLICATION

This present application is a national stage filing under 35 U.S.C § 371 of PCT application number PCT/KR2016/015267 filed on Dec. 26, 2016 which is based upon and claims the benefit of priority to Korean Patent Application No. 10-2015-0190032 filed on Dec. 30, 2015 in the Korean Intellectual Property Office. The disclosures of the above-listed applications are hereby incorporated by reference herein in their entirety.

TECHNICAL FIELD

The present invention relates to a motion control system and method using detection of motions in a video, and more particularly, to a motion control system and method using detection of motions in a video that is capable of controlling a motion control device by means of motion codes produced in real time from the detection of motions in the video while the video is being reproduced, thereby providing the motions synchronized with the video for theater customers.

BACKGROUND ART

In a video playing facilities like movie theaters, only a video is provided for theater customers in conventional practices, but recently, a variety of effects are provided for them, while the video is being played at a theater.

Generally, a theater, at which a general video is played, is called a 2D theater, and a theater, at which a specially photographed video is played to make theater customers feel reality when they see the video, is called a 3D theater. Further, a theater, at which the theater customers's smell and touch are stimulated together their sight and hearing to make them feel their five senses, is called a 4D theater.

In the 4D theater, a motion base is disposed on the underside of a chair to move the chair, and moreover, special effect mechanisms for providing a variety of effects for theater customers are mounted on the chair and the inner walls or ceiling of the theater.

While the theater customers are seeing the video at their chair, in this case, they directly feel the motions synchronized with the video and various effects like water, wind, smoke, light, heat and so on, thereby allowing them to have lots of fun and enhancing their sense of involvement in the video.

In the video playing facilities, further, chairs are moved up and down, left and right, and back and forth, by actuators, thereby making the theater customers to feel as if they really move. The motions of the actuators are controlled by a motion control device.

So as to control the motions of the actuators, the motion control device previously stores the motion codes corresponding to time codes before the video is played and controls the motions of the actuators according to the previously stored motion codes if the video is played.

In the conventional practices, however, the motion control device has to store the motion codes in advance so as to drive the actuators, so that disadvantageously, the motion codes should be made separately before the video is played.

DISCLOSURE

Technical Problem

Accordingly, the present invention has been made in view of the above-mentioned problems occurring in the prior art, and it is an object of the present invention to provide a motion control system and method using detection of motions in a video that is capable of producing motion codes in real time while video is being reproduced and transmitting the produced motion codes to a motion control device, thereby providing the motions synchronized with the video for theater customers.

It is another object of the present invention to provide a motion control system and method using detection of motions in a video that is capable of detecting the motions in the video using motion vectors and residual values on video standards, transmitting the directions of the detected motions and the magnitudes of forces of the detected motions to a motion control device, thereby providing screens and motions of actuators at the same time for theater customers.

On the other hand, the technical problems to be solved by the present invention may be not limited as the above-mentioned problems, and various technical problems can be derived from the description as will be discussed hereinafter within the technical scope of the invention which is obvious to those skilled in the art.

Technical Solution

To accomplish the above-mentioned objects, according to a first aspect of the present invention, there is provided a motion control system using detection of motions in a video, including: a video processing device for decoding encoded video to extract motion vectors and residual values of effective macroblocks, producing motion codes using the extracted motion vectors and residual values of the effective macroblocks, reproducing the decoded video, and transmitting the produced motion codes and the time codes corresponding to the video being reproduced to a motion control device; and the motion control device for receiving the time codes and motion codes from the video processing device and controlling motions of actuators according to the motion codes if the time values of the time codes and motion codes correspond to each other.

According to the present invention, desirably, the video processing device designates the effective macroblocks in input video, encodes the motion vectors and residual values of the effective macroblock, and produces the encoded video.

According to the present invention, desirably, the motion control system further includes a video managing device for designating the effective macroblocks in the input video, encoding the motion vectors and residual values of the effective macroblock, producing the encoded video, and transmitting the produced encoded video to the video processing device.

To accomplish the above-mentioned objects, according to a second aspect of the present invention, there is provided a video processing device including: a decoding unit for decoding encoded video, extracting motion vectors and residual values of effective macroblocks, and producing motion codes using the extracted motion vectors and residual values of the effective macroblocks; a reproduction unit for reproducing the decoded video from the decoding unit; and a transmission unit for transmitting the motion codes produced from the decoding unit and the time codes corresponding to the video reproduced in the reproduction unit to a motion control device.

According to the present invention, desirably, the video processing device further includes an encoding unit for designating the effective macroblocks in the input video, encoding the motion vectors and residual values of the effective macroblocks, and producing the encoded video.

According to the present invention, desirably, the encoding unit includes: an effective macroblock designation module for performing DCT (Discrete Cosine Transform) conversion for the macroblocks of the input video and designating the macroblocks having the DCT conversion result value greater than a predetermined threshold value as the effective macroblocks; a motion compensation module for calculating the motion vector between the effective macroblock to be currently encoded and a reference macroblock, performing motion compensation using the calculated motion vector, and producing the residual value; and an encoding module for performing DCT conversion and quantization for the produced residual value, encoding the quantized residual value and motion vector, and producing the encoded video.

According to the present invention, desirably, the decoding unit includes: a decoding module for decoding the encoded video and extracting the motion vectors and residual values of the effective macroblocks; a representative motion vector calculator for calculating a representative motion vector value using the motion vectors of all effective macroblocks; a force calculator for determining the representative motion vector value as a direction of a force and calculating the magnitude of the force using the residual values of the effective macroblocks and the number of effective macroblocks; and a motion code extractor for producing the motion codes including the direction and magnitude of the force and time.

To accomplish the above-mentioned objects, according to a third aspect of the present invention, there is provided a motion control device including: a reception unit for receiving time codes and motion codes; and a motion controller for comparing the time of the motion codes and the time of the time codes and controlling the motions of actuators according to the motion codes if the time of the motion codes corresponds to the time of the time codes.

According to the present invention, desirably, the motion codes include the direction and magnitude of the force and the time thereof, and the motion controller drives the actuators with the direction and magnitude of the force.

To accomplish the above-mentioned objects, according to a fourth aspect of the present invention, there is provided a motion control method using detection of motions in a video, including the steps of: (a) decoding encoded video to extract motion vectors and residual values of effective macroblocks, and producing motion codes using the extracted motion vectors and residual values of the effective macroblocks, through a video processing device; (b) reproducing the decoded video and transmitting the produced motion codes and the time codes corresponding to the video being reproduced to a motion control device, through the video processing device; and (c) comparing the time values of the time codes and motion codes with each other and controlling motions of actuators according to the motion codes if the time values of the time codes and motion codes correspond to each other, through the motion control device.

According to the present invention, desirably, the motion control method further includes, before the step (a), the step of designating the effective macroblocks in input video, encoding the motion vectors and residual values of the effective macroblock, and producing the encoded video, through the video processing device.

According to the present invention, desirably, the step (a) includes the steps of: decoding the encoded video and extracting the motion vectors and residual values of the effective macroblocks; calculating a representative motion vector value using the motion vectors of all effective macroblocks; determining the representative motion vector value as a direction of a force and calculating the magnitude of the force using the residual values of the effective macroblocks and the number of effective macroblocks; and producing the motion codes including the direction and magnitude of the force and time.

On the other hand, the motion control system and method using the detection of motions in the video is carried out in the form of a program recorded in recording media readable in an electronic device or distributed through a program download managing device (server, etc.).

Advantageous Effects

According to the present invention, the motion control system and method can produce motion codes in real time while video is being reproduced and transmit the produced motion codes to the motion control device, so that even if the motion codes are not made and stored in advance, the motions synchronized with the video can be provided for theater customers.

Further, the motion control system and method according to the present invention can detect the motions in the video using motion vectors and residual values on video standards, transmit the directions of the detected motions and the magnitudes of forces of the detected motions to the motion control device, thereby providing the screens and motions of actuators at the same time for theater customers.

Furthermore, the motion control system and method according to the present invention can control the motions of the actuators using the motion vectors and residual values obtained during the encoded video is decoded, so that there is no need to perform any separate operation for controlling the motions of the actuators.

The effects of the present invention may be not limited as the above-mentioned effects, and various effects can be derived from the description as will be discussed hereinafter within the technical scope of the invention which is obvious to those skilled in the art.

MODE FOR INVENTION

Hereinafter, a motion control system and method using detection of motion in a video according to the present invention will be described in detail with reference to the accompanying drawings. The following embodiments are provided only for illustrative purposes so that those skilled in the art can fully understand the spirit of the present invention, but the present invention is not limited thereby.

Moreover, it is to be understood that all matters herein set forth in the accompanying drawings are to be interpreted as illustrative and may be in different forms from those actually implemented.

Meanwhile, components described below are merely examples to implement the present invention. Therefore, other components may be used in other embodiments without departing from the idea and scope of the invention.

Moreover, each component may be implemented only in hardware, or only in software, or in various combinations of hardware and software performing the same functions. Furthermore, two or more elements may be implemented by a piece of hardware or software.

In this application, terms, such as "comprise", "include", or "have" are intended to designate any parts which are described in the specification, and it should be understood that they do not preclude the possibility of the existence or possible addition of one or more additional parts.

Figure 1:
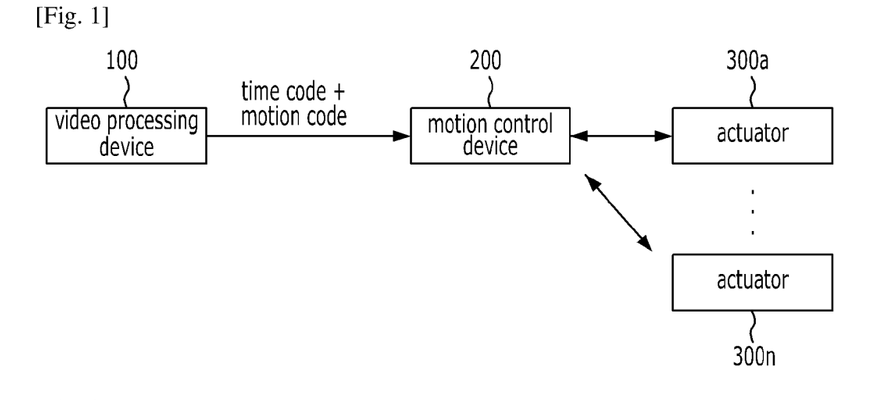
FIG. 1 is a schematic block diagram showing a motion control system using detection of motions in a video according to the present invention.

FIG. 1 is a schematic block diagram showing a motion control system using detection of motions in a video according to the present invention.

Referring to FIG. 1, a motion control system using detection of motions in a video according to the present invention includes a video processing device 100, a motion control device 200, a plurality of actuators, 300, 300b, . . . , 300n, (hereinafter, referred to as 300). In this case, a plurality of motion control devices 200 is provided at the whole theater, and each motion control device controls the plurality of actuators 300.

The video processing device 100 is provided in a video playing facility (for example, a movie theater) to play the video. Generally, the video is played continuously with 24 frames per one second in the video playing facility. The frames are stop screens of the video, and each frame has a time code. In this case, the time code indicates information on the time synchronized with the video.

The video processing device 100 designates effective macroblocks in the video to be played in the video playing facility, encodes motion vectors and residual values of the effective macroblocks, and produces the encoded video.

Further, the video processing device 100 decodes and plays the encoded video if it is time for playing the video and transmits motion codes and time codes for the motions of the actuators 300 to the motion control device 200. That is, the video processing device 100 decodes the encoded video to extract the motion vectors and residual values of the effective macroblocks, produces motion codes using the extracted motion vectors and residual values of the effective macroblocks, reproduces the decoded video, and transmits the produced motion codes and the time codes corresponding to the video being reproduced to the motion control device 200. Accordingly, the screens and the motions of the actuators 300 can be at the same time transmitted to the theater customers.

Like this, the video processing device 100 produces the motion codes in real time through the extracted motion vectors and residual values upon the decoding of the encoded video and then transmits the motion codes to the motion control device 200, so that the precise motions synchronized with the video can be provided for the theater customers.

On the other hand, the video processing device 100 is formed of a single operation unit or a collection device having two or more operation units connected to each other. For example, the video processing device 100 is formed of a single server or two or more servers connected to each other.

A detailed explanation on the video processing device 100 will be given later with reference to FIG. 2.

The motion control device 200 receives the time codes and motion codes from the video processing device 100 and controls the motions of the actuators 300 according to the motion codes if the time values of the received time codes and motion codes correspond to each other. A detailed explanation on the motion control device 200 will be given later with reference to FIG. 5

The actuators 300 are disposed correspondingly on chair units or a set of chairs to drive the chairs according to predetermined degrees of freedom. For example, each actuator 300 conducts three degrees of freedom (roll, pitch and heave) or four degrees of freedom (roll, pitch, heave and sway) according to its driving type.

According to the present invention, on the other hand, the video processing device 100 performs both of encoding and decoding of the video, but the motion control system further includes a video managing device (not shown). In this case, the video managing device encodes the video to be played in the video playing facility and provides the encoded video to the video processing device 100. At this time, the video managing device designates effective macroblocks in the video, encodes motion vectors and residual values of the effective macroblocks, produces the encoded video, and transmits the produced encoded video to the video processing device 100.

Figure 2:
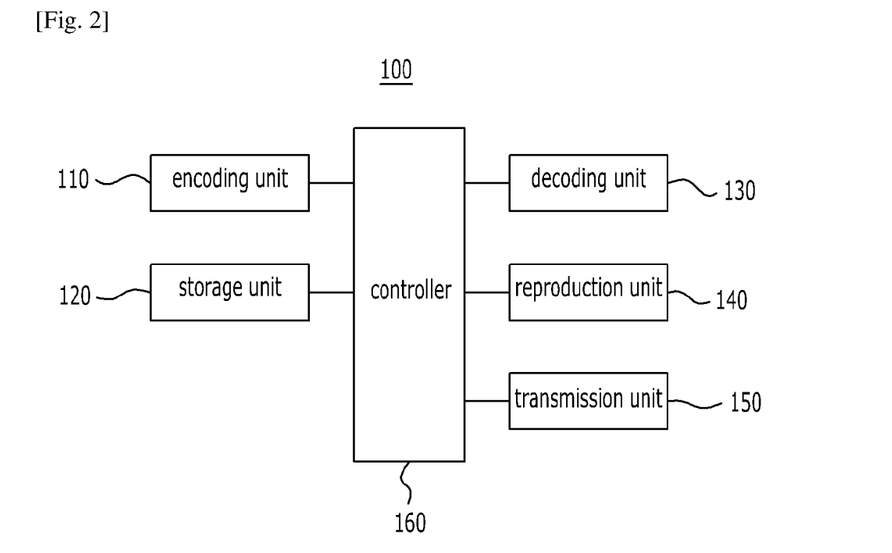
FIG. 2 is a schematic block diagram showing the structure of a video processing device in the motion control system according to the present invention.
Figure 3:
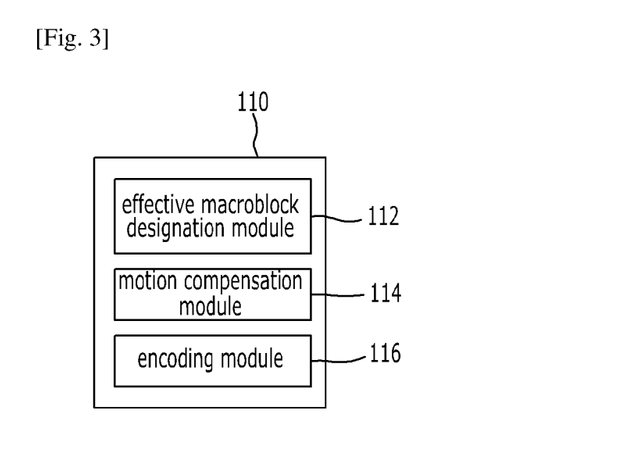
FIG. 3 is a block diagram showing the structure of an encoding unit of FIG. 2.
Figure 4:
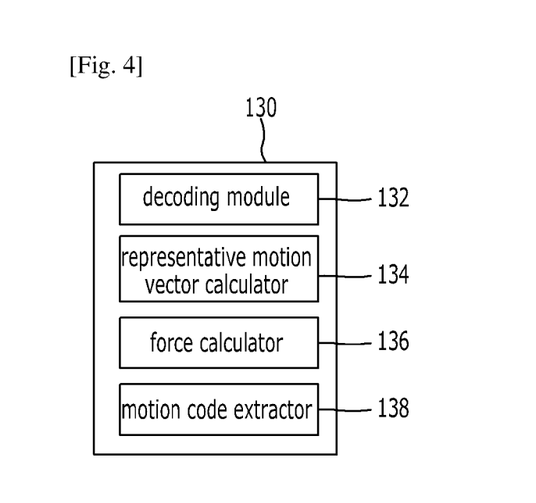
FIG. 4 is a block diagram showing the structure of a decoding unit of FIG. 2.

FIG. 2 is a schematic block diagram showing the structure of the video processing device in the motion control system according to the present invention, FIG. 3 is a block diagram showing the structure of an encoding unit of FIG. 2, and FIG. 4 is a block diagram showing the structure of a decoding unit of FIG. 2.

Referring first to FIG. 2, the video processing device 100 includes an encoding unit 110, a storage unit 120, a decoding unit 130, a reproduction unit 140, a transmission unit 150 and a controller 160.

The encoding unit 110 designates effective macroblocks in the input video, encodes motion vectors and residual values of the effective macroblocks, and produces the encoded video.

Referring to FIG. 3, the encoding unit 110 includes an effective macroblock designation module 112, a motion compensation module 114 and an encoding module 116.

The effective macroblock designation module 112 performs DCT (Discrete Cosine Transform) conversion for the macroblocks of the input video and designates macroblocks having the DCT conversion result value greater than a predetermined threshold value as effective macroblocks. That is, the effective macroblock designation module 112 segments the input video into macroblocks having N×N pixels and performs the DCT conversion for the video in the unit of the macroblock. After that, the effective macroblock designation module 112 compares the DCT conversion result value with the predetermined threshold value and determines the macroblocks having the DCT conversion result value greater than the set threshold value as effective macroblocks, while determining the macroblocks having the DCT conversion result value less than the predetermined threshold value as ineffective macroblocks. In this case, the threshold value may be arbitrarily set by a user, and if not set by the user, the threshold value may be the mean value of the DCT conversion values of all macroblocks. The effective macroblock designation module 112 stores the results indicating whether the macroblocks are effective or ineffective macroblocks. At this time, the effective macroblock designation module 112 stores the results with the coordinates (horizontal and vertical) of the macroblocks and effective values (0=ineffective and 1=effective).

The motion compensation module 114 calculates the motion vector between the effective macroblock to be currently encoded and a reference macroblock, performs motion compensation using the calculated motion vector, and produces a residual value. That is, the motion compensation module 114 performs motion prediction for the current effective macroblock, acquires the motion vector, performs the motion compensation using the acquired motion vector, produces a prediction block, and produces the residual value as a difference between the produced prediction block and the current effective macroblock. Like this, the motion compensation module 114 performs the motion compensation in the unit of the effective macroblock and extracts the motion vector and residual value in the unit of the effective macroblock.

The encoding module 116 performs DCT conversion and quantization for the residual values produced from the motion compensation module 114, encodes the quantized residual values and the motion vectors, and produces the encoded video.

The storage unit 120 stores the data related to the operations of the video processing device 100. Further, the storage unit 120 stores the information on the encoded video. The storage unit 120 includes a variety of kinds of memory devices.

The decoding unit 130 decodes the encoded video if it is time for playing the video, extracts the motion vectors and residual values of the effective macroblocks, and produces the motion codes using the extracted motion vectors and residual values of the effective macroblocks.

Referring to FIG. 4, the decoding unit 130 includes a decoding module 132, a representative motion vector calculator 134, a force calculator 136 and a motion code extractor 138.

The decoding module 132 decodes the encoded video and extracts the motion vectors and residual values of the effective macroblocks. That is, the decoding module 132 performs entropy decoding for the encoded video, acquires the motion vectors for motion compensation, decodes the encoded video, performs inverse quantization and inverse DCT conversion for the decoded video, and acquires the residual values. At this time, the decoding module 132 stores the motion vectors and residual values of the effective macroblocks.

The representative motion vector calculator 134 calculates a representative motion vector value using the motion vectors of all effective macroblocks. That is, the representative motion vector calculator 134 divides the sum of all motion vector values by the total number of motion vectors to obtain the representative motion vector value, as indicated by a first mathematical expression.

Representative motion vector value=the sum of all motion vector values/the total number of motion vectors [First Mathematical Expression]

The force calculator 136 determines the representative motion vector value as a direction of a force and calculates the magnitude of the force using the residual values of the effective macroblocks and the number of effective macroblocks. That is, the force calculator 136 determines the direction of the representative motion as the direction of force and divides the sum of the residual values of the effective macroblocks by the number of effective macroblocks extracted to calculate the magnitude of the force, as indicated by a second mathematical expression.

Magnitude of force=the residual values of effective macroblocks/the number of effective macroblocks [Second Mathematical Expression]

The motion code extractor 138 produces the motion codes including the directions and magnitudes of the force and time.

The reproduction unit 140 reproduces the decoded video from the decoding unit 130.

The transmission unit 150 transmits the motion codes produced from the decoding unit 130 and the time codes corresponding to the video reproduced in the reproduction unit 140 to the motion control device 200. That is, the transmission unit 150 transmits the time codes indicating the reproduction time of the video and the motion codes to the motion control device 200. Accordingly, the screens and the motions of the actuators 300 can be at the same time provided for the theater customers.

On the other hand, the operations of the encoding unit 110, the storage unit 120, the decoding unit 130, the reproduction unit 140 and the transmission unit 150 are performed by the processors that execute programs on a computing device. Like this, the encoding unit 110, the storage unit 120, the decoding unit 130, the reproduction unit 140 and the transmission unit 150 perform their operation through their physically independent configuration, and otherwise, they may be functionally divided in a single processor.

The controller 160 controls the operations of the video processing device 100 having the encoding unit 110, the storage unit 120, the decoding unit 130, the reproduction unit 140 and the transmission unit 150.

The controller 160 includes at least one operation unit, and in this case, the operation unit is selected from general-purpose central processing unit CPU and a complex programmable logic device CPLD, a field programmable gate array FPGA, an application specific integrated circuit ASIC or a microcontroller chip for a specific purpose.

According to the present invention, in this case, the video processing device 100 includes the encoding unit 110. However, the encoding unit 110 may be disposed in a separate device, and the video processing device 100 may receive the encoded video from the separate device.

Figure 5:
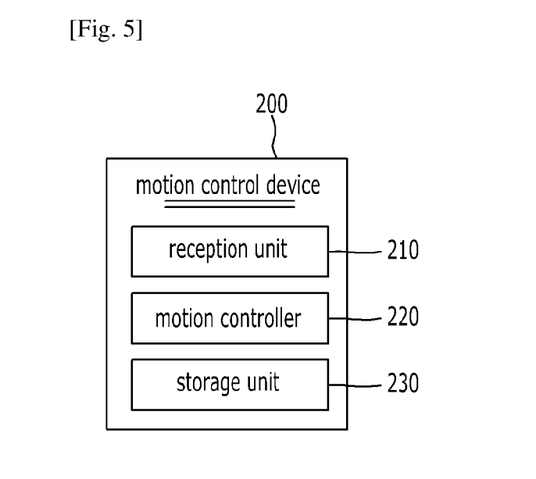
FIG. 5 is a schematic block diagram showing the structure of a motion control device of the motion control system according to the present invention.

FIG. 5 is a schematic block diagram showing the structure of the motion control device of the motion control system according to the present invention.

Referring to FIG. 5, the motion control device 200 includes a reception unit 210, a motion controller 220, and a storage unit 230.

The reception unit 210 receives the time codes and motion codes from the video processing unit 100 and stores them in the storage unit 230. In this case, the motion codes include the directions and magnitudes of the force and the time thereof, and the time codes indicate the time corresponding to the video reproduced.

The motion controller 220 compares the time of the motion codes and the time of the time codes and if the time of the motion codes corresponds to the time of the time codes, controls the motions of the actuators 300 according to the motion codes. That is, the motion controller 220 drives the actuators 300 with the directions and magnitudes of the force in the motion codes. If the time of the motion codes does not correspond to the time of the time codes, the actuators 300 are not driven, but they are driven on the time codes corresponding to the motion codes. Like this, the motion control device 200 drives the actuators 300 in real time even though the motion codes are not stored in advance or separately.

Figure 6:
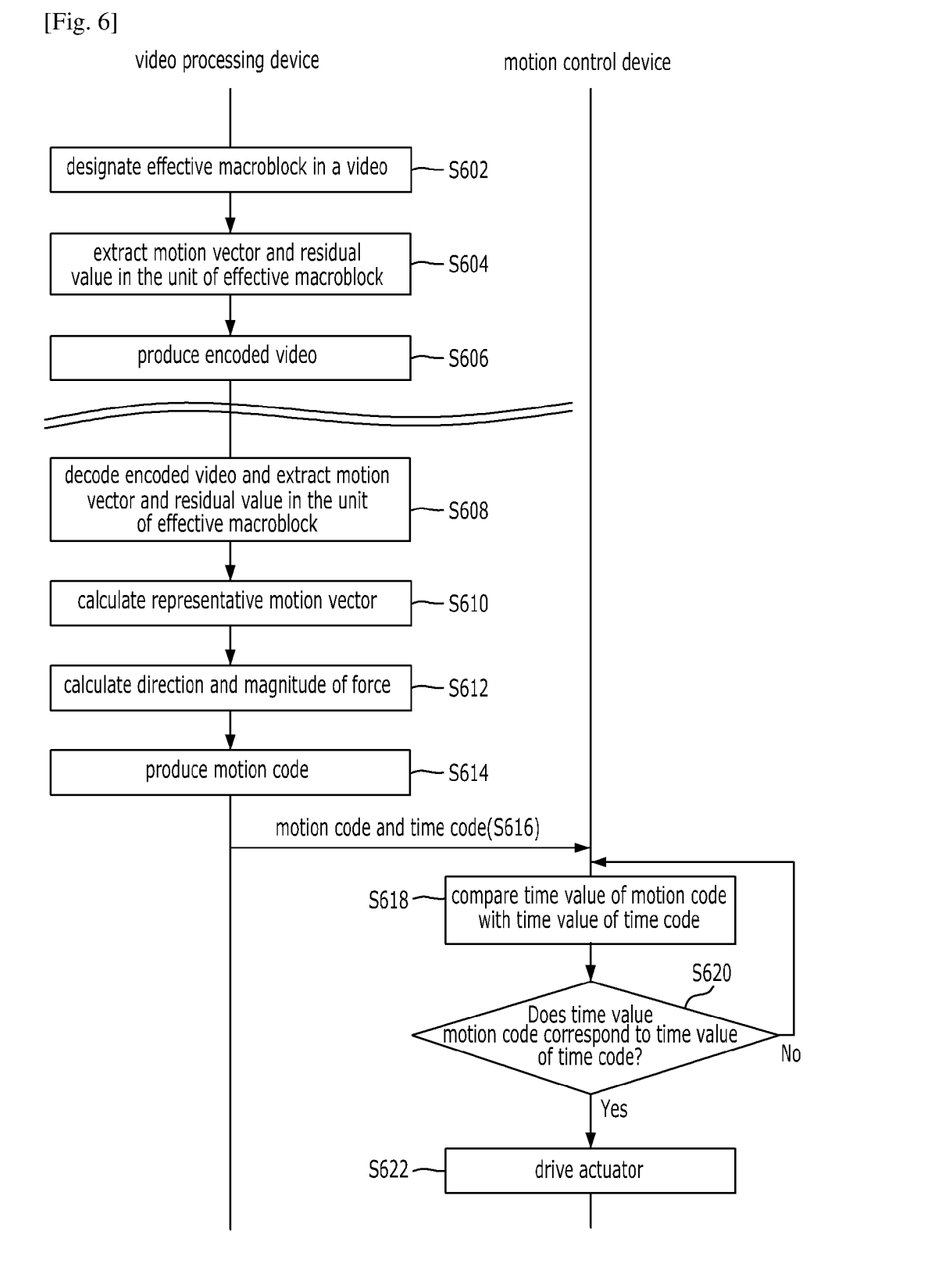
FIG. 6 is a flow chart showing an example of a motion control method using detection of motions in a video according to the present invention.

FIG. 6 is a flow chart showing an example of a motion control method using detection of motions in a video according to the present invention.

Referring to FIG. 6, effective macroblocks in input video are designated through a video processing device (at step S602). That is, the input video is segmented into macroblocks having N×N pixels and DCT conversion is performed in the unit of the macroblock through the video processing device. Through the video processing device, after that, the DCT conversion result value is compared with a predetermined threshold value, and if the DCT conversion result value is greater than the predetermined threshold value, the macroblocks are determined as effective macroblocks. Contrarily, if the DCT conversion result value is less than the predetermined threshold value, the macroblocks are determined as ineffective macroblocks. Through the video processing device, that is, the motion vector between the effective macroblock to be currently encoded and a reference macroblock is calculated, and motion compensation using the calculated motion vector is performed to produce a residual value (at step S604).

If the step S604 is performed, DCT conversion and quantization for the produced residual value are performed, the quantized residual value and motion vector are encoded, and the encoded video is produced through the video processing device (at step S606). At this time, the encoded video is stored through the video processing device.

If it is time for playing the video, after that, the encoded video is decoded to extract the motion vectors and residual values of the effective macroblocks through the video processing device (at step S608).

Next, a representative motion vector value is calculated using the motion vectors of all effective macroblocks (at step S610), and the direction and magnitude of the force are calculated (at step S612) using the calculated representative motion vector value, through the video processing device. At this time, the video processing device divides the sum of all motion vector values by the total number of motion vectors to obtain the representative motion vector value, determines the representative motion vector value as the direction of a force, and calculates the magnitude of the force by dividing the residual values of the effective macroblocks by the number of effective macroblocks.

If the step (S612) is finished, the motion codes including the directions and magnitudes of the force and time are produced (at step S614), and the produced motion codes and the time codes are transmitted to the motion control device (at step S616) through the video processing device. At this time, the video processing device reproduces the decoded video and transmits the time codes indicating the reproduction time of the video and the motion codes to the motion control device.

The time of the motion codes is compared with the time of the time codes (at step S618) to determine whether the time of the motion codes corresponds to the time of the time codes (at step S620), through the motion control device.

If the time of the motion codes corresponds to the time of the time codes, the actuators 300 are driven through the motion control device (at step S622). At this time, the actuators 300 are driven with the directions and magnitudes of the forces in the motion codes through the motion control device. Accordingly, the screens and the motions synchronized with the video can be provided at the same time for the theater customers.

Figure 7:
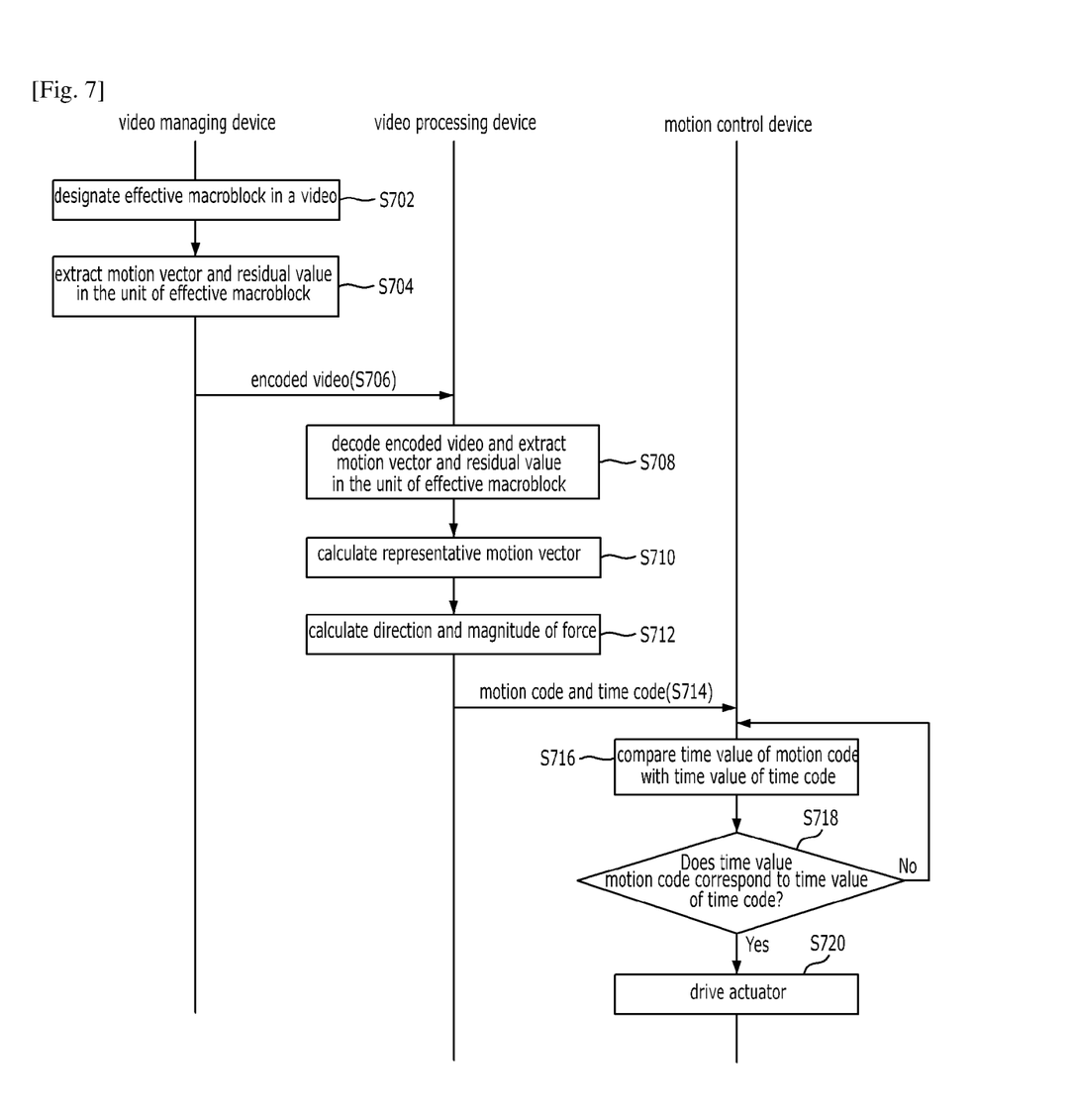
FIG. 7 is a flow chart showing another example of the motion control method using detection of motions in a video according to the present invention.

FIG. 7 is a flow chart showing another example of the motion control method using detection of motions in a video according to the present invention.

Referring to FIG. 7, effective macroblocks in input video are designated (at step S702) and motion vectors and residual values of the effective macroblock are extracted (at step S704) through a video managing device.

After that, DCT conversion and quantization for the produced residual values are performed, and the quantized residual values and motion vectors are encoded, and the encoded video and produced and transmitted to the video processing device (at step S706) through the video managing device.

If it is time for playing the video, after that, the encoded video is decoded to extract the motion vectors and residual values of the effective macroblocks through the video processing device (at step S708).

Next, a representative motion vector value is calculated using the motion vectors of all effective macroblocks (at step S710), and the directions and magnitudes of the forces are calculated (at step S712) using the calculated representative motion vector value, through the video processing device.

If the step (S712) is finished, the motion codes including the directions and magnitudes of the forces and time are produced through the video processing device (at step S714). While the decoded video is being reproduced, at this time, the time codes indicating the reproduction time of the video and the motion codes are transmitted to the motion control device through the video processing device.

The time of the motion codes is compared with the time of the time codes (at step S716) to determine whether the time of the motion codes corresponds to the time of the time codes (at step S718), through the motion control device.

If the time of the motion codes corresponds to the time of the time codes, the actuators 300 are driven through the motion control device (at step S720). At this time, the actuators 300 are driven with the directions and magnitudes of the forces in the motion codes through the motion control device. Accordingly, the screens and the motions synchronized with the video can be provided at the same time for the theater customers.

The motion control method using the detection of motions in the video is carried out by a program, and codes and code segments of the program are easily made by a programmer skilled in the art. Further, the program for the motion control method using the detection of motions in the video is stored in recording media readable by an electronic system, and it is read and carried out by the electronic system.

It will be understood by those skilled in the art that the present invention may be embodied in other specific forms without departing from the spirit and essential characteristics thereof. Accordingly, it should be understood that the above-described embodiments are only exemplary, but are not restrictive from any standpoint, that the scope of the present invention is defined by the accompanying claims, rather than the above detailed description, and that the meaning and scope of the claims and all changes and modifications derived from equivalents thereof should be interpreted as being included in the scope of the present invention.

The invention claimed is:

1. A motion control system using detection of motions in a video, comprising:
    a video processing device for decoding encoded video to extract motion vectors and residual values of effective macroblocks, producing motion codes using the extracted motion vectors and residual values of the effective macroblocks, reproducing the decoded video, and transmitting the produced motion codes and time codes corresponding to the video being reproduced to a motion control device, and
    the motion control device for receiving the time codes and the motion codes from the video processing device and controlling motions of actuators according to the motion codes if the time values of the time codes and the motion codes correspond to each other,
    wherein the video processing device is further configured to:
        obtain a representative motion vector value by dividing a sum of all motion vector values of effective macroblocks by a number of total motion vectors;
        determine the representative motion vector value as a direction of a force;
        calculate a magnitude of the force by dividing a sum of the residual values of the effective macroblocks by a number of effective macroblocks; and
        produce the motion codes including the directions and magnitudes of the force and time.

2. The motion control system according to claim 1, wherein the video processing device designates the effective macroblocks in input video, encodes the motion vectors and residual values of the effective macroblock, and produces the encoded video.

3. The motion control system according to claim 1, further comprising a video managing device for designating the effective macroblocks in the input video, encoding the motion vectors and residual values of the effective macroblock, producing the encoded video, and transmitting the produced encoded video to the video processing device.

4. The motion control system according to claim 1, wherein the video processing device comprises:
    a decoding unit for decoding encoded video, extracting motion vectors and residual values of effective macroblocks, and producing motion codes using the extracted motion vectors and residual values of the effective macroblocks;
    a reproduction unit for reproducing the decoded video from the decoding unit; and
    a transmission unit for transmitting the motion codes produced from the decoding unit and the time codes corresponding to the video reproduced in the reproduction unit to a motion control device.

5. The motion control system according to claim 4, further comprising an encoding unit for designating the effective macroblocks in the input video, encoding the motion vectors and residual values of the effective macroblocks, and producing the encoded video.

6. The motion control system according to claim 5, wherein the encoding unit comprises:
    an effective macroblock designation module for performing DCT (Discrete Cosine Transform) conversion for the macroblocks of the input video and designating the macroblocks having the DCT conversion result value greater than a predetermined threshold value as the effective macroblocks;
    a motion compensation module for calculating the motion vector between the effective macroblock to be currently encoded and a reference macroblock, performing motion compensation using the calculated motion vector, and producing the residual value; and
    an encoding module for performing DCT conversion and quantization for the produced residual value, encoding the quantized residual value and motion vector, and producing the encoded video.

7. The motion control system according to claim 1, wherein the motion control device comprises:
    a reception unit for receiving time codes and motion codes; and
    a motion controller for comparing the time of the motion codes and the time of the time codes and controlling the motions of actuators according to the motion codes if the time of the motion codes corresponds to the time of the time codes.

8. The motion control system according to claim 7, wherein the motion codes comprise the direction and magnitude of the force and the time thereof, and the motion controller drives the actuators with the direction and magnitude of the force.

9. A motion control method using detection of motions in a video, comprising the steps of:
    (a) decoding encoded video to extract motion vectors and residual values of effective macroblocks, and producing motion codes using the extracted motion vectors and residual values of the effective macroblocks, through a video processing device;
    (b) reproducing the decoded video and transmitting the produced motion codes and the time codes corresponding to the video being reproduced to a motion control device, through the video processing device; and
    (c) comparing the time values of the time codes and motion codes with each other and controlling motions of actuators according to the motion codes if the time values of the time codes and motion codes correspond to each other, through the motion control device,
    wherein
    the step (a) comprises:
        obtaining a representative motion vector value by dividing a sum of all motion vector values of effective macroblocks by a number of total motion vectors, through the video processing device;
        determining the representative motion vector value as a direction of a force, through the video processing device;
        calculating a magnitude of the force by dividing a sum of the residual values of the effective macroblocks by a number of effective macroblocks, through the video processing device; and
        producing the motion codes including the directions and magnitudes of the force and time, through the video processing device.

10. The motion control method according to claim 9, further comprising, before the step (a), the step of designating the effective macroblocks in input video, encoding the motion vectors and residual values of the effective macroblocks, and producing the encoded video, through the video processing device.

\* \* \* \* \*